(12) United States Patent
Agblevor

(10) Patent No.: US 8,202,332 B2
(45) Date of Patent: Jun. 19, 2012

(54) FRACTIONAL CATALYTIC PYROLYSIS OF BIOMASS

(75) Inventor: Foster A. Agblevor, Christiansburg, VA (US)

(73) Assignee: Virginia Tech Intellectual Properties, Blacksburg, VA (US)

( * ) Notice: Subject to any disclaimer, the term of this patent is extended or adjusted under 35 U.S.C. 154(b) by 890 days.

(21) Appl. No.: 12/184,757

(22) Filed: Aug. 1, 2008

(65) Prior Publication Data

US 2009/0165378 A1 Jul. 2, 2009

Related U.S. Application Data

(60) Provisional application No. 60/953,266, filed on Aug. 1, 2007.

(51) Int. Cl.
C10J 3/00 (2006.01)
C10L 3/00 (2006.01)

(52) U.S. Cl. ....... 48/197 R; 48/198.6; 48/209; 252/373; 423/648.1

(58) Field of Classification Search ................ 48/197 R, 48/198.6, 209; 252/373; 423/648.1
See application file for complete search history.

(56) References Cited

U.S. PATENT DOCUMENTS

| 4,508,886 | A | 4/1985 | Russell et al. |
| 5,728,271 | A | 3/1998 | Piskorz et al. |
| 6,814,940 | B1 | 11/2004 | Hiltunen et al. |
| 2010/0212215 | A1* | 8/2010 | Agblevor ........................ 44/300 |

FOREIGN PATENT DOCUMENTS

| JP | 2007-153924 | 6/2007 |
| JP | 2007-153925 | 6/2007 |
| KR | 10-2006-0102778 | 9/2006 |

OTHER PUBLICATIONS

Agblevor et al., "Fast Pyrolysis of Stored Biomass Feedstocks", Energy & Fuels, 1995, pp. 635-640, vol. 9 No. 4.
Scott et al., "The Flash Pyrolysis of Aspen-Poplar Wood", Canadian Journal of Chemical Engineering, 1982, pp. 666-674, vol. 60.
Graham et al., "Fast Pyrolysis of Biomass", Journal of Analytical and Applied Pyrolysis, 1984, pp. 95-135, vol. 6.
Diebold et al., "Production of Primary Pyrolysis Oils in a Vortex Reactor", Pyrolysis Oils from Biomass,Soltes, 1988, pp. 31-40, EJ.; Milne T.A., Eds.; ACS Symposium Series 376; American Chemical Society: Washington DC.
Piskorz et al., "Composition of Oils Obtained by Fast Pyrolysis of Different Woods", In Pyrolysis oils from biomass: producing. analyzing, and upgrading, Soltes, EJ. and Milne TA, Eds.; ACS Symposium Series 376; 1988, pp. 167-178, American Chemical Society: Washington DC.
Elder T. "Effect of Process Conditions on the Yield of Pyrolytic Products from Southern Pine", Wood and Fiber Science, 1984, pp. 169-179, vol. 16, No. 2.

Evans et al., "Molecular Characterization of the Pyrolysis of Biomass. 1. Fundamentals", Energy & Fuels,1987, pp. 123-137, vol. 1, No. 2.
Font et al., "Fluidized-Bed Flash Pyrolysis of Almond Shells. Temperature influence and Catalyst Screening", Industrial Engineering & Chemistry Product Research Development, 1986, pp. 491-496, vol. 25.
Maschio et al., "Pyrolysis, a Promising Route for Biomass Utilization", Bioresource Technology, 1992, pp. 219-231, vol. 42.
Besler et al., "Fluidized Bed Pyrolysis of Terrestrial Biomass Feedstocks", In Proc. Bioenergy '94, Sixth National Bioenergy Conference. Western Regional Biomass Energy Program: Golden, CO, 1994; pp. 43-50, vol. I.
Czernik et al., "The Production of Liquid Fuel by Fast Pyrolysis of Biomass", Journal of Solar Energy Engineering, 1995, pp. 2-6, vol. 117.
Scott et al., "Liquid Products from Continuous Flash Pyrolysis of Biomass", Industrial Engineering & Chemistry Product Research Development, 1985, pp. 581-588, vol. 24.
Bohn et al., "Biomass Pyrolysis with an Entrained Flow Reactor", Industrial Engineering & Chemistry Product Research Development, 1984, pp. 355-363, vol. 23.
Scott et al., "The Continuous Flash Pyrolysis of Biomass", Canadian Journal of Chemical Engineering, 1984, pp. 404-412, vol. 62.
Diebold et al., "Additives to Lower and Stabilize Viscosity of Pyrolysis Oils During Storage", Energy & Fuels, 1997, pp. 1081-1091, vol. 11, No. 5.
Aubin et al., "Study on the Corrosiveness of Wood Pyrolysis Oils", Fuel Science International, 1990, pp. 77-86, vol. 8, No. 1.
Agblevor et al., "Pyrolysis Char Catalyzed Destabilization of Biocrude Oils", In Innovative Advances in the Forest Product Industries, AICHE Symposium Series 319; American Institute of Chemical Engineers, 1998, pp. 146-150, vol. 94, New York, NY.
Agblevor et al., "Inorganic Compounds in Biomass Feedstocks. 1. Effect on the Quality of Fast Pyrolysis Oils", Energy & Fuels, 1996, pp. 293-298, vol. 10, No. 2.
Agblevor et al., "Pyrolytic Analysis and Catalytic Upgrading of Lignocellulosic Materials by Molecular Beam Mass Spectrometry", In Energy from Biomass and Wastes XVII. Institute of Gas Technology (IOT), 1993, pp. 767-795, Chicago, IL.
Sharma et al., "Upgrading of Wood-Derived Bio-Oil Over HZSM-5", Bioresource Technology, 1991, pp. 57-66, vol. 35, No. 1.
Srinivas et al., "Thermal and Catalytic Upgrading of Biomass Derived Oil in a Dual Reaction System", Canadian Journal of Chemical Engineering, 2000, pp. 343-354, vol. 78, No. 2.
Sharma et al., "Catalytic Upgrading of Biomass-Derived Oils to Transportation Fuels and Chemicals", Canadian Journal of Chemical Engineering, 1991, pp. 1071-1081, vol. 69.
Bhatiav et al., "Catalytic Conversion of Euphorbia Nerifolia Biocrude into Petroleum Hydrocarbons. Short Communications", Fuel, 1988, pp. 1708-1709, vol. 67.

(Continued)

Primary Examiner — Timothy Vanoy
(74) Attorney, Agent, or Firm — Blank Rome LLP

(57) ABSTRACT

Methods for fractional catalytic pyrolysis which allow for conversion of biomass into a slate of desired products without the need for post-pyrolysis separation are described. The methods involve use of a fluid catalytic bed which is maintained at a suitable pyrolysis temperature. Biomass is added to the catalytic bed, preferably while entrained in a non-reactive gas such as nitrogen, causing the biomass to become pyrolyzed and forming the desired products in vapor and gas forms, allowing the desired products to be easily separated.

24 Claims, 4 Drawing Sheets

OTHER PUBLICATIONS

Figure 1:
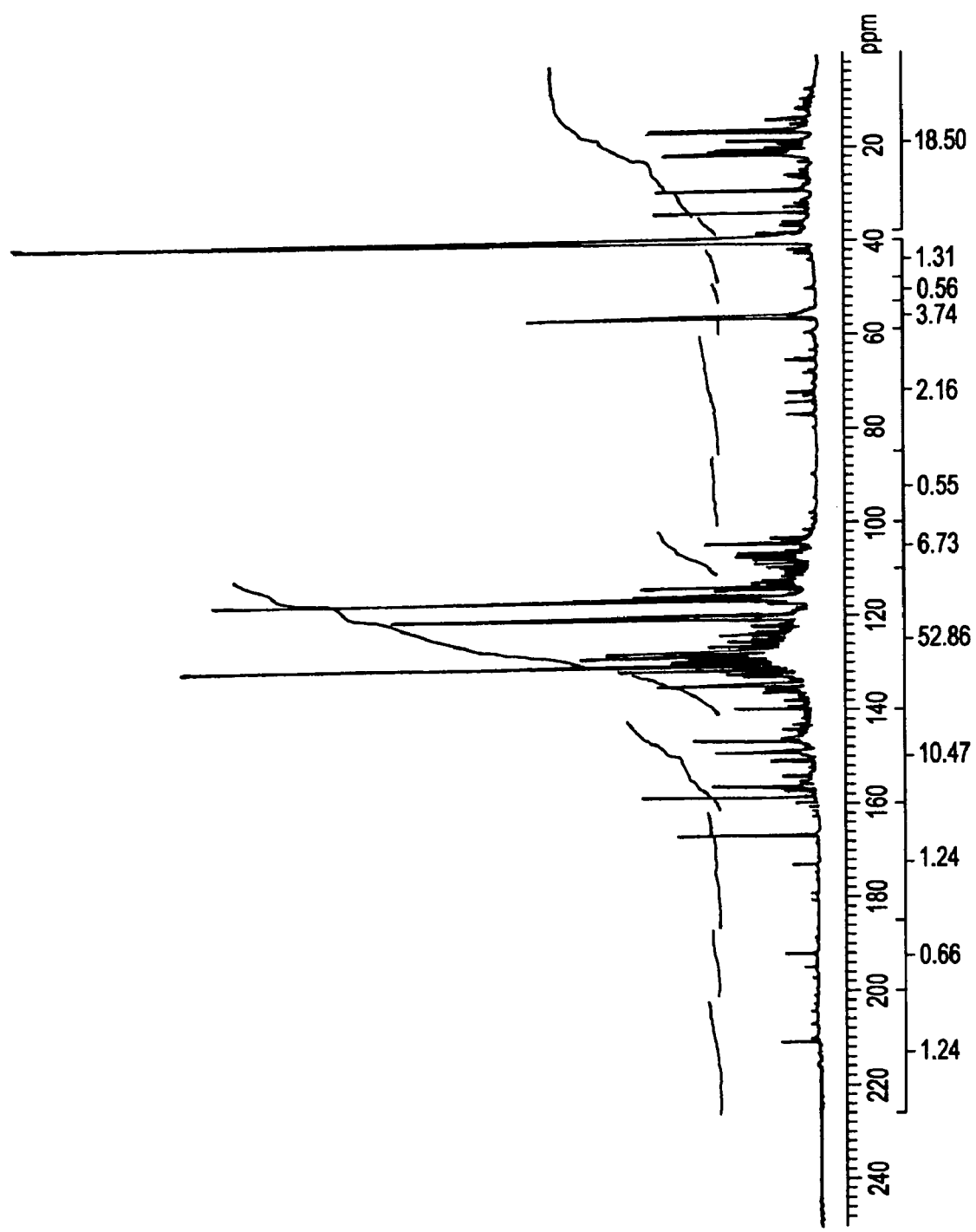

Weisz et al., "Catalytic Production of High-Grade Fuel (Gasoline) from Biomass Compounds by Shape-Selective Catalysis", Science, 1979, pp. 57-58, vol. 206.

Bahtia et al., "Upgrading of Biomass Constituents to Liquid Fuels", Fuel, 1993, pp. 101-104, vol. 72.

Diebold et al., "Biomass to Gasoline: Upgrading Pyrolysis Vapors to Aromatic Gasoline with Zeolite Catalysis at Atmospheric Pressure", In Pyrolysis Oils from Biomass; American Chemical Society, 1988, pp. 264-276, ACS Symposium Series 376, Washington, D.C.

Chum et al., "Biomass Pyrolysis Oil Feedstocks for Phenolic Adhesives", In Adhesives from Renewable Resources, Hemingway, American Chemical Society, 1989, pp. B5-B151, ACS Symposium Series 385, Washington DC.

Elder, Thomas J., "The Characterization and Potential Utilization of Phenolic Compounds Found in Pyrolysis Oil", Ph.D. Dissertation, Texas A&M University, 1979, pp. iii-92.

Rolin et al.,"Catalytic Conversion of Biomass by Fast Pyrolysis", Journal of Analytical and Applied Pyrolysis, 1983, pp. 151-166, vol. 5.

Edye et al., "Transition Metals as Catalysts for Pyrolysis and Gasification of Biomass", Preprints, Fuel Chemistry Division, 1991, pp. 1715-1722, 202nd ACS National Meeting, New York, NY.

Aznar et al., "Improved Steam Gasification of Lignocellulosic Residues in a Fluidized Bed with Commercial Steam Reforming Catalyst", Industrial Engineering and Chemical Research, 1993, pp. 1-10, vol. 32.

Paisley et al., "Biomass Gasification for Gas-Turbine-Based Power Generation", Journal of Engineering/or Gas Turbines and Power, 1998, pp. 284-288, vol. 120, No. 2.

Di Blasi et al., "Countercurrent Fixed-Bed Gasification of Biomass at Laboratory Scale", Industrial Engineering and Chemical Research, 1999, pp. 2571-2581, vol. 38, No. 7.

Corella et al., "Biomass Gasification with Air in Fluidized Bed: Reforming of the Gas Composition with Commercial Steam Reforming Catalysts", Industrial Engineering and Chemical Research, 1998, pp. 4617-4624, vol. 37, No. 7.

Agblevor et al., "Production of Oxygenated Fuels from Biomass: Impact of Feedstock Storage", Fuel Science & Technology International, 1996, pp. 589-612, vol. 14, No. 4.

Horne et al., "The Effect of Zeolite ZSM-5 Catalyst Deactivation Using the Upgrading of Biomass Derived Pyrolysis Vapors", Journal of Analytical and Applied Pyrolytics, 1995, pp. 65-85, vol. 34.

Milne et al., "Standardized Analytical Methods", Biomass & Bioenergy, 1992, pp. 341-366, vol. 2, Nos. 1-6.

* cited by examiner

FRACTIONAL CATALYTIC PYROLYSIS OF BIOMASS

CLAIM OF PRIORITY

This application claims priority to U.S. Provisional Patent Application No. 60/953,266, filed Aug. 1, 2007, the disclosure of which is hereby incorporated by reference herein.

FIELD OF THE INVENTION

The present invention relates to processes for pyrolytic conversion of biomass materials into fuels and other usable products. The present invention describes a pyrolytic process wherein the biomass materials are selectively converted into desired products eliminating potential secondary, post-pyrolysis, processing steps.

BACKGROUND OF THE INVENTION

Conventional rapid pyrolysis (RP) of biomass is a thermal treatment process in the absence of air, which produces char, liquid, and gaseous products [1-14]. In these processes, the pyrolysis temperatures range from 450° C.-600° C. and vapor residence times are less than one second to five seconds. In the RP process, liquid production is maximized at the expense of gaseous and solid products. The liquid product (bio-oil or biocrude) is generally unstable, acidic, corrosive, viscous, and has high moisture content [15-18]. The poor stability of biocrude oils is attributed to the char and alkali metals in the oil, which catalyze secondary reactions during storage [17]. However, if the hot pyrolysis vapors are filtered to reduce the char content before condensation, the stability of the oil is improved considerably [18].

Biocrude oils are complex mixtures of carbohydrate and lignin thermal decomposition products, which cannot be used for most biobased products and fuel applications except after considerable secondary processing. Secondary processing such as catalytic upgrading [19-26], liquid-liquid extraction [27-29], or gasification [30-35] increase the cost of the final product and make it less economically competitive relative to fossil derived products.

Catalytic studies of biomass pyrolysis products have focused on upgrading of pyrolysis oils (post pyrolysis catalysis) to higher value products [19-26], but most of these studies reported low yields of hydrocarbons, high coke/char yields, and rapid deactivation of the catalysts. Other catalytic studies of whole biomass feedstocks focused on gasification to synthesis gas [30-35], but fractional pyrolysis have not been reported in published literature.

Biomass feedstocks are composed of structural (lignin, cellulose, and hemicellulose) and non-structural (extractives) components, which have distinct chemical properties. It is conceivable to selectively convert the biomass constituents to a defined slate of chemicals and separate these products in situ (fractional pyrolysis) without necessarily going through secondary extraction and upgrading processes. Fractional pyrolysis is defined as a selective in situ conversion of biopolymers to desired products. This approach is aided by catalysts and can produce a narrow slate of pyrolysis products, which can be tailored to specific applications. This approach has potential application for converting whole biomass feedstocks, biomass-to-ethanol residues, and organosolv lignins (pulping residues) into high-value products. Potential products include synthesis gas, phenol formaldehyde resins, phosphate esters, magnetic wire, cleaning and disinfectant compounds, ore floatation, and miscellaneous applications.

As such, there remains a need in the art for processes to selectively convert biomass components in situ into suitable products using suitable catalysts and thus eliminating potential secondary processing steps.

SUMMARY OF THE INVENTION

It is an object of the present invention to provide processes for the fractional catalytic pyrolysis of biomass feedstocks. The processes of the present invention both catalyze the pyrolysis of biomass feedstocks and isolate useful pyrolysis products, eliminating the need for further processing steps.

The processes of the present invention involve use of a fluidized catalyst bed maintained at a temperature suitable for pyrolysis of biomass. The biomass is entrained in the fluid used to fluidize the catalyst bed, causing the biomass to be delivered to the catalyst bed and be pyrolyzed. The vapors and gases released during pyrolysis are carried from the fluidized catalyst bed by the fluid, where they are then collected in various fractions. As the pyrolysis products are collected in fractions, they are sufficiently isolated to be suitable for downstream uses, and no further processing steps are needed. The processes of the present invention can provide many useful pyrolysis products from a wide variety of biomass feedstocks without the need for further processing of these products.

DETAILED DESCRIPTION OF THE DRAWINGS

FIG. 1. $^{13}$C-NMR spectra of fractional catalytic pyrolysis liquid product of hybrid poplar wood collected from the electrostatic precipitator (ESP).

Figure 2:
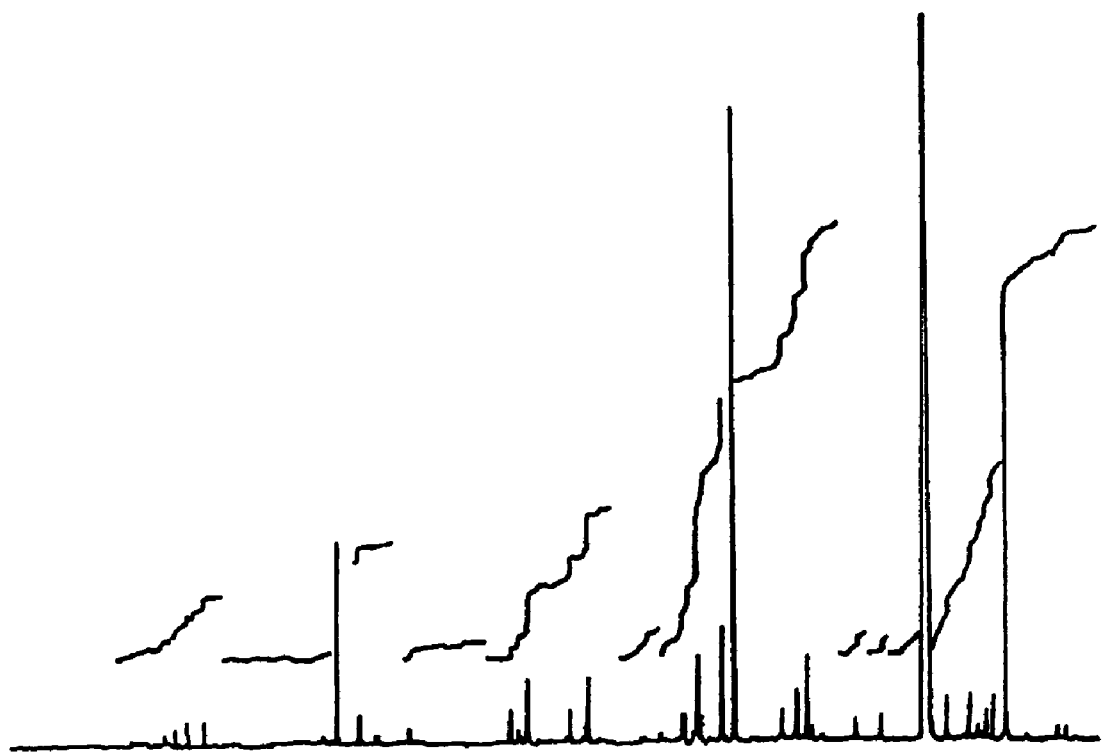

FIG. 2. $^{13}$C-NMR spectra of fractional catalytic pyrolysis liquid product of hybrid poplar wood from the chilled water (second) condenser.

Figure 3:
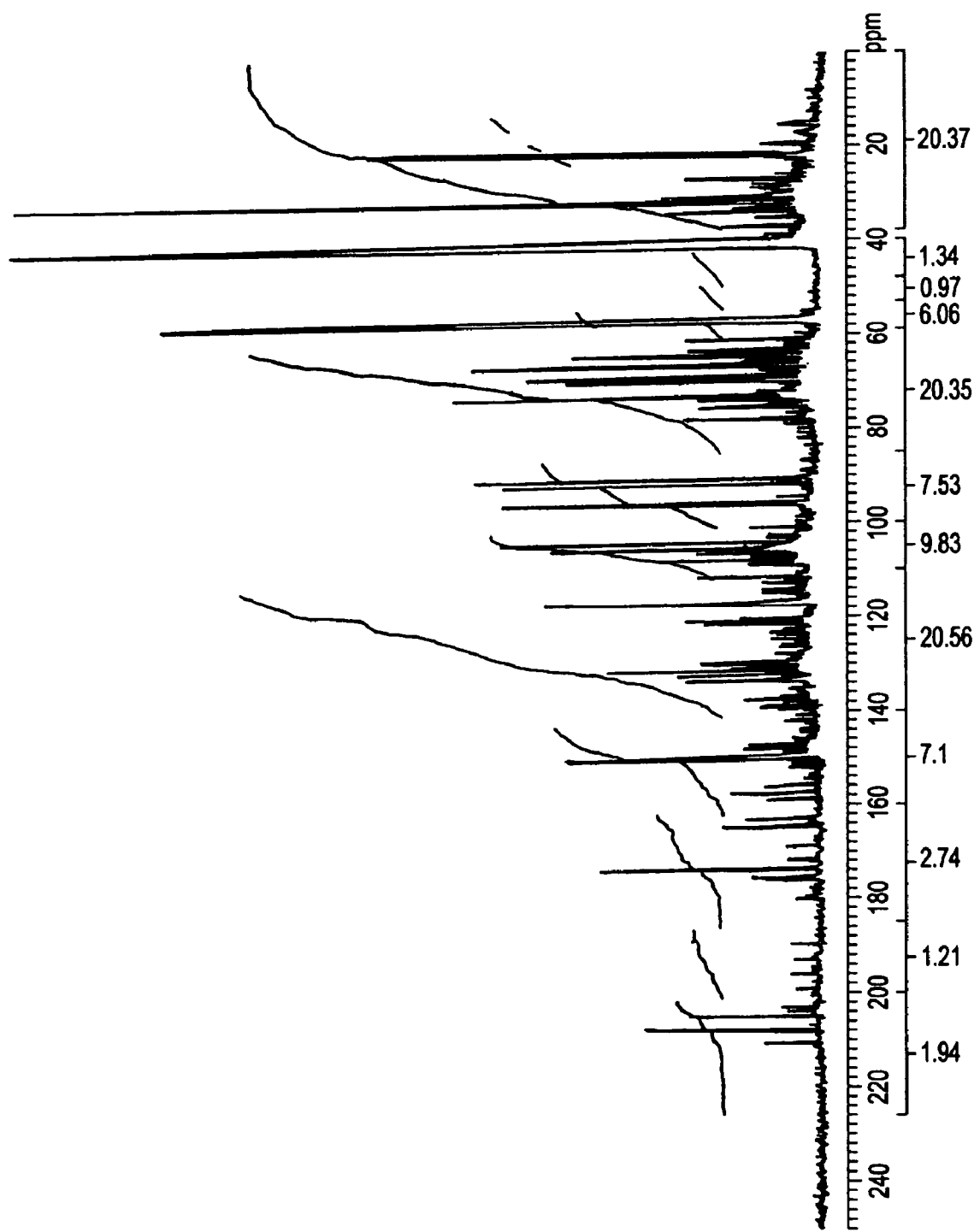

FIG. 3. $^{13}$C-NMR spectrum of conventional rapid pyrolysis liquid product of hybrid poplar wood.

Figure 4:
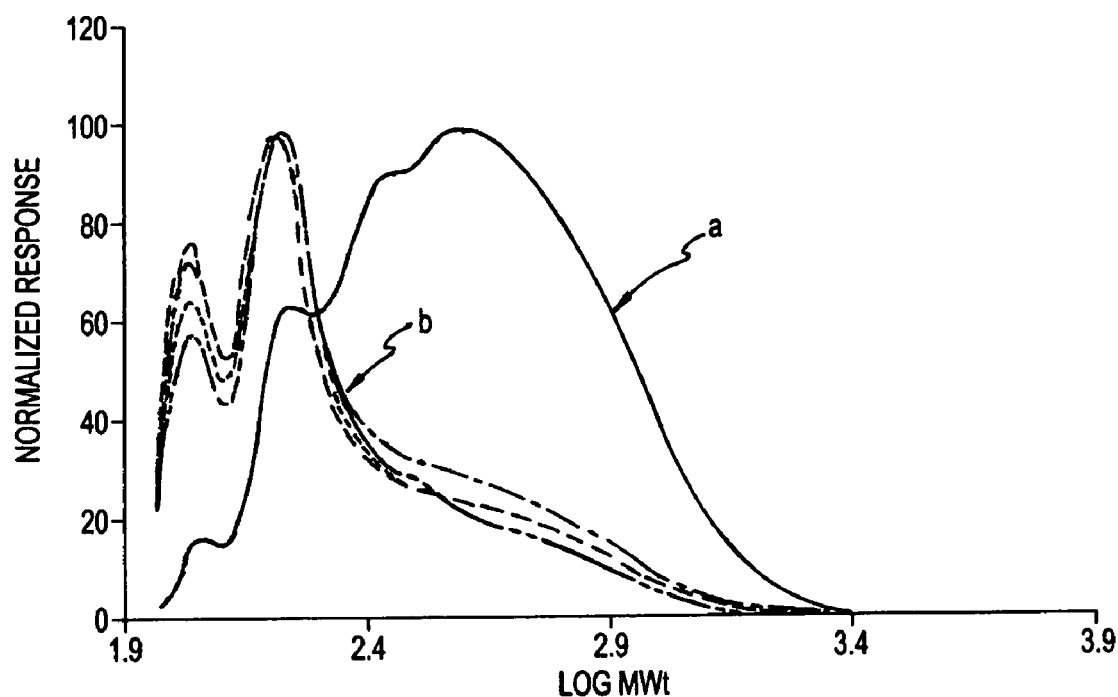

FIG. 4. A plot of the molecular weight distribution of hybrid poplar catalytic pyrolysis oils and phenol/neutral fraction extracted from sugar cane bagasse conventional rapid pyrolysis oils: a) bagasse phenol/neutral fraction; b) hybrid poplar catalytic pyrolysis oils.

Figure 5:
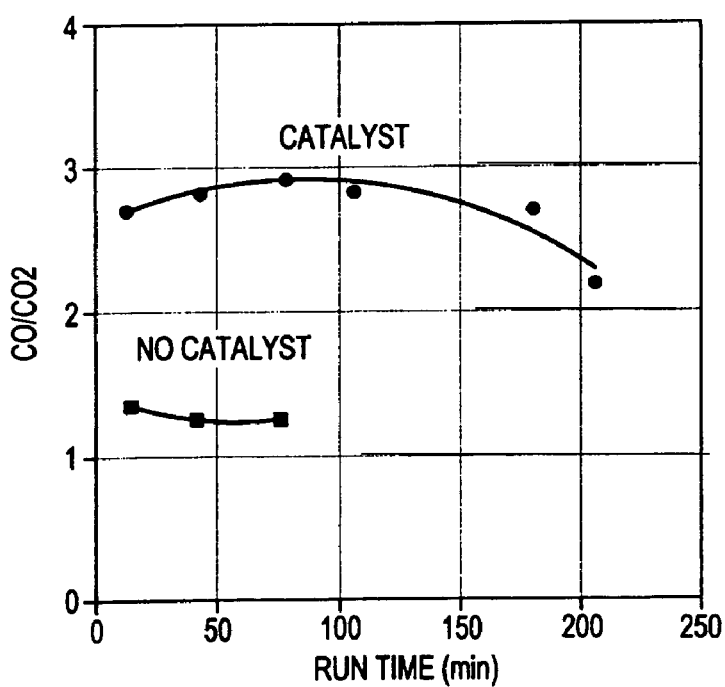

FIG. 5. A plot of the variation of carbon monoxide and carbon dioxide content during fractional and conventional pyrolysis of hybrid poplar wood.

DETAILED DESCRIPTION OF THE INVENTION

The present invention provides processes for fractional catalytic pyrolysis of biomass materials. The processes of the present invention allow for the in situ conversion of biomass components into suitable products, eliminating the need for additional processing steps.

The processes of the present invention involve the use of a suitable catalyst in a fluidized bed pyrolysis system. In typical embodiments of the present invention, the reactor used for performing the pyrolysis is a fluidized bed reactor as is well known in the art. Examples of fluidized bed reactors can be found in Howard, J.R. (1989). "Fluidized Bed Technology Principles and Applications." New York, N.Y.: Adam Higler; Tavoulareas, S. (1991.) Fluidized-Bed Combustion Technology. Annual Reviews Inc. 16, 25-27; and Trambouze, P., & Euzen, J. (2004). "Chemical Reactors: From Design to Operation." (R. Bonormo, Trans.). Paris: Editions Technip, which are all hereby incorporated by reference. In the system of the present invention, the fluidizing medium is a suitable catalyst, and the bed is fluidized with a suitable fluid.

The biomass to be pyrolyzed is typically ground to a small particle size in order to effect rapid pyrolysis. The biomass may be ground in a mill until the desired particle size is achieved. Typically, the particle size of the biomass to be pyrolyzed is a particle size sufficient to pass through a 1-mm screen up to a particle size sufficient to pass through a 30-mm screen.

Various type of biomass may be pyrolyzed using the processes of the present invention. Biomass materials including whole plant materials, biomass residues such as residues formed during ethanol production, such as corn stover, and residues formed during distillation, such as distiller's waste grain, switchgass, and organosolv lignins can be used as feedstock for the processes of the present invention. In certain embodiments of the invention, wood is used as the biomass feedstock. It is contemplated that any biomass feedstock which is suitable for use in a rapid pyrolysis system can be used with in the fractional catalytic pyrolysis processes of the present invention.

The biomass to be pyrolyzed is loaded into an entrainment compartment to be carried into the fluidized bed by the fluid. The biomass may be loaded into a feed hopper or other device which allows for it to be delivered to the entrainment compartment in a suitable amount. In this manner, a constant amount of biomass is delivered into the entrainment compartment.

Once the biomass enters the entrainment compartment, it is carried by the fluid to the reactor bed. In certain embodiments of the present invention, the fluid used is nitrogen gas. However, it is also contemplated that other non-oxidizing fluids could be used in the processes of the present invention. It is further contemplated that the pyrolysis gas produced during the processes can be recycled and used as the entrainment fluid. In this manner, the costs of performing the pyrolysis can be greatly reduced.

The fluid carries the biomass from the entrainment compartment to the fluidized bed through a feeder tube. Typically, the feeder tube is cooled in some manner to maintain the temperature of the biomass before it enters the fluidized bed. The feeder tube may be cooled by jacketing the tube, typically with an air-cooled or liquid-cooled jacket. However, it is also contemplated that the feed tube not be cooled.

The fluidized bed of the reactor comprises a catalyst suitable to produce the desired products. In certain embodiments of the present invention, is the catalyst VPISU-001, which is also known as H-ZSM-5, an alumnosilicate zeolite catalyst sold by Exxon Mobil of Irving, Tex. It is also contemplated that other zeolite catalysts can be used in the processes of the present invention. Further, it is contemplated that super acid catalysts, such as sulfated zirconium super acid catalysts, can be used for performing the processes of the present invention.

Depending on the catalyst used and the desired reaction products, the catalyst temperature may be adjusted. In certain embodiments, the catalyst temperature may be between about 400° C. and about 650° C., more preferably between about 450° C. and 600° C., and most preferably about 500° C. The flow rate of the fluid is set so that the apparent pyrolysis vapor residence time is about 1 s, however, other longer or shorter vapor residence times, such as about 0.5 to about 5 seconds, may also be used with the processes of the present invention. Gas flow and other parameters, such as temperature and pressure, may be monitored from a single data acquisition unit, such as an Omega data acquisition unit from Omega Engineering, Inc. of Stamford, Conn.

The biomass feedstock may be fed into the reactor for as long as is necessary to process the desired amount of feedstock. A pyrolysis run may be as short as minutes and may be as long as several hours as needed. The catalysts used in the described systems retain their catalytic activity for extended periods of time, allowing for long reaction times. The rate at which biomass feedstock may be fed into the reactor may be varied depending, with typical feed rates of about 50 to about 150 g/h being used and a feed rate of about 100 g/h being preferable.

The temperature of different parts of the reactor may be measured and regulated using temperature devices known in the art such as thermocouples. If such devices are used, they may be linked to the data acquisition unit. Typically, measurements may be taken and the temperature regulated in the catalyst bed, directly above the bed, and at the exit of the reactor. The catalyst bed temperature may be measured and maintained as described above. It is desirable to have the temperature above the bed and at the exit zone of the reactor to be set at a lower temperature than the catalysts to avoid cracking of the pyrolysis products. The temperature of the area above the bed and the exit zone may be the same or different, and may be between about 10° and about 100° C. less than the temperature of the catalysts, with a preferred temperature difference of about 50° C.

The gases and vapors exiting the reactor may be passed through a filter to remove and solids entrained in the exiting fluid. If filters are used, it is preferred that they be hot gas filters to prevent condensation of the pyrolysis vapors. When used, the hot gas filters may be kept at a suitable temperature to prevent condensation, for example between about 3000 to about 500° C. The reactor may have pressure gauges that measure the pressure at various points in the fluid stream. Total gas flow through the system may be determined by a rotameter. Feedback from these instruments may also be transmitted to the data control system.

After the pyrolysis vapors exit the reactor, they are passed through a condensation train to collect the desired products. Typically, the condensation train will comprise one or more chilled water condensers, one or more electrostatic precipitator and one or more coalescence filter, as are well known in the art, all of which will be connected in series. While the order of the condensers can be varied, it is typical that the first condenser is a water cooled condenser. When used, the electrostatic precipitator may be kept at a voltage of about 15 to about 25 kV, more preferably between about 18 to about 20 kV. The voltage of the electrostatic precipitator may also be regulated by the data acquisition unit. All gasses that pass through the condensation train may also be collected at the end of the train.

Oils and other products are recovered from the various condensers in the condensation train to form isolated pyrolysis products. The products isolated from at least one of the condensers will be pyrolysis products which are ready for use as fuels or chemical feedstocks. The isolated pyrolysis products will have low moisture content, lower viscosity and will be less acidic and corrosive than normal rapid pyrolysis products. Preferably, one or more of the collected fractions will contain phenolics with little to no carbohydrate pyrolysis products. Products that may be obtained using the processes of the present invention include phenols, cresols, catechols, guaiacol, methyl-substituted phenols, indene, substituted napthalene and other aromatics. Typically, the fractions of desired phenolics will contain little to no benzene, toluene, xylenes or other undesired aromatics. Of course, the pyrolysis products obtained will vary depending upon the biomass feedstock and catalysts used. Gas collected from the reactor may contain synthesis gas and other useful gases. Char and coke solids may remain in the reactor, and may be separated from the catalyst bed and collected. $C_1$-$C_4$ hydrocarbons may also be produced using the processes of the present invention. These hydrocarbons may be steam reformed into hydrogen rich gas or may be used in other applications.

As the pyrolysis products produced using the processes of the present invention are produced at relatively moderate temperatures, they are suitable for more downstream processing applications than products produced through higher temperature processes, such as oxidative processes. Further, as the pyrolysis products of the present invention are produced at lower temperature, they are less likely to include impurities that are formed in processes that take place at about 900° C. and above.

Overall, potential pyrolysis products may have applications as fuels, adhesives, synthesis gas, phenol formaldehyde resins, phosphate esters, magnetic wire, cleaning and disinfectant compounds, ore floatation and other applications. Importantly, the pyrolysis products obtained will be in conditions that are suitable for use in other applications without the need for extensive secondary processing steps, as are needed with rapid pyrolysis products. Further, non limiting, examples of potential pyrolysis products are given in the examples below.

Pyrolysis products may be analyzed using techniques well known in the art, such as gas chromatography/mass spectrometry (GC/MS), gel permeation chromatography (GPC), and nuclear magnetic resonance (NMR). Non-limiting examples of analysis of pyrolysis products are shown in the examples below.

Non-limiting examples of fractional catalytic pyrolysis processes are given below. It should be apparent to one of skill in the art that there are variations not specifically set forth herein that would fall within the scope and spirit of the invention as claimed below.

EXAMPLES

Example 1

Preparation of Feedstocks and Catalyst

The feedstock used for this experiment was a hybrid poplar whole wood ground in a Wiley mill (model 4) to pass a 1-mm screen. The moisture content of the feed was 5%. A proprietary catalyst (VPISU-001-H-ZMS-5 zeolite from Exxon Mobil of Irving, Tex.) was used for the runs. Two hundred gram batches of this catalyst were used for the fluidized bed pyrolysis experiments.

Example 2

Fluidized Bed Pyrolysis

The reactor consisted of a 50 mm (2-in) schedule 40 stainless steel pipe, 500 mm (20 in.) high (including a 140-mm (5.5 in.) preheater zone below the gas distribution plate) and equipped with a 100-μm porous metal gas distributor. The fluidizing medium was the above proprietary catalyst, and the bed was fluidized with nitrogen. The reactor was externally heated with a three zone electric furnace. The reactor tube contained a bubbling fluid bed with back mixing of the feed and catalyst.

The biomass was loaded into a feed hopper (batch-wise) and conveyed by a twin-screw feeder into an entrainment compartment where high-velocity nitrogen gas entrained the feed and carried it through a jacketed air-cooled feeder tube into the fluidized bed. The pyrolysis temperature was maintained at 500° C. and the apparent pyrolysis vapor residence time was about 1 s. The apparent residence time of gases and vapors is defined as the free reactor volume (the empty reactor volume minus the volume of hot catalyst) divided by the entering gas flow rate expressed at reactor conditions. A typical run lasted for 2-3 h, and the feed rate was 100 g/h. The feed rate, gas flow rate, and reactor temperature were kept constant during each run.

The catalyst and reactor temperatures were measured and controlled by three K-thermocouples inserted into a thermal well dipping into the catalyst bed. One thermocouple spanned the full length of the thermal well and this was used to measure and control the catalyst bed temperature. The next thermocouple was maintained above the bed height and the third thermocouple measured the exit temperature of the pyrolysis vapors and gases. The catalyst bed temperature was maintained at 500° C., but the area above the bed and the exit zone were nominally set at 450° C. to avoid any possible cracking of the pyrolysis products in these zones.

Pyrolysis gases and vapors exiting the reactor passed through a heated hot gas filter unit to separate char/ash and any entrained catalyst. The hot-gas filter temperature was maintained at 400° C. to avoid condensation of the pyrolysis vapors. The pyrolysis gases and vapors were then passed through a condensation train consisting of a chilled water condenser, an electrostatic precipitator, and a coalescence filter (all connected in series). The electrostatic precipitator was maintained at 18-20 kV throughout the run. The temperatures, gas flow rates, pressure drop across the reactor, and electrostatic precipitator voltage were controlled and/or monitored by an Omega data acquisition unit sold by Omega Engineering, Inc. of Stamford, Conn. Pressure drop across the hot gas filter was monitored by a pressure gage.

The gas samples were collected in syringes and analyzed after each run. Total gas flow was measured by a rotameter. To ensure good mass closure, the entire setup (excluding the rotameter) was weighed before and after the run. The pyrolysis oils collected from each condenser receiver were kept separate and analyzed by GC/MS, GPC, and $^{13}$C-NMR. The residual pyrolysis oils on the walls of the condensers were recovered (after weighing the pyrolysis unit) by rinsing the condensers with acetone. The acetone was evaporated under vacuum (40° C. and 61.3 kPa), and the oils recovered. None of the oils recovered from the acetone wash was used for analysis, because there is always some residual acetone associated with this fraction and the potential of losing some volatile components during the operation precludes it from being a true representative of the pyrolysis oils.

The char/coke content was determined by weighing the reactor/catalyst and hot gas filter before and after each run, the difference in weight was recorded as char/coke. No attempt was made to differentiate between the char and coke and no further analysis was done.

Example 3

Gas Analysis

The pyrolysis gases were sampled and analyzed on a Shimadzu GC14A sold by Shimadzu Corp. of Kyoto, Japan. Three packed columns (Porapak N, molecular sieve 5A, and Hysep Q, sold by Agilent Technologies of Santa Clara, Calif.) connected in series were used to analyze the gases. The oven was temperature programmed and a thermal conductivity detector was used. The chromatogram conditions are shown below:

Columns: 3.2 mm×2 m Porapak N 80/100 mesh; and 3.2 mm×2 m Molecular sieve 5A 60/80 mesh, and 3.2×2 m Hysep Q 100/180 mesh.

Detector: Thermal conductivity (TCD) at 200° C.

Injection temperature: 150° C.

Carrier gas: helium at 30 mL/min.

Oven temperature programming:

Initial temperature: 30° C. for 3.00 min.

Level 1: Heating rate 20° C./min; final temperature 60° C. for 4 min.

Level 2: Heating rate 25° C./min; final temperature 200° C. for 9 min.

Method of separation: Column 1 (Porapak N) separated the sample into two fractions: $N_2$, $O_2$, $CH_4$ and CO which eluted quickly as one peak and were directed to column 2 (molecular sieve 5A) which separated these gases. The other fraction of the sample, which was composed of $CO_2$, $C_2$-$C_4$ gases moved very slowly and were directed to column 3 (Hysep Q) which separated them into various components. The column switching was accomplished by automatic valve switching using Shimadzu CLASSVP program. The gas chromatogram was processed using the Shimadzu CLASSVP program.

Example 4

Pyrolysis Products

During first half hour of pyrolysis, there was very little condensation of pyrolysis products and the products were mostly gases. The material balances for two fractional catalytic pyrolysis runs are shown in Table 1. Compared to rapid non-catalytic pyrolysis (RP), the total liquid yields for these runs were very low (30%), and the gas yields were very high (60%). The char/coke yields (11.5%) were comparable to those reported for conventional pyrolysis of hybrid poplar wood [1].

TABLE 1

Material balance on catalytic pyrolysis of hybrid poplar feedstock (on as received basis).

| Fractions | Run 1461-40 #4 | Run 1461-42 #5 | | |
|---|---|---|---|---|
| Gas Yield (%) | 60 | 55.0 | | |
| Total Liquids (%) | 30.6 | 30.1 | | |
| Char/Coke (%) | 11.5 | 11.9 | | |
| Total | 102.1 | 97.0 | | |
| Liquid Fractions collected | | | Color | # Phases |
| Chilled Water Condenser (g) | 19.9 | 18.9 | Brown | 1 |
| Ice/Water Condenser (g)* | 14.7 | 16.8 | Yellow | 1 |
| ESP (g) | 25.7 | 25.3 | Brown | 1 |
| Total Liquids (g) | 60.3 | 61 | Brown | 2 |
| Total Biomass Pyrolyzed (g) | 197 | 202 | | |

*This fraction had 95% water and 5% dissolved organics.

Three liquid fractions from the first two condensers and the ESP that were very different from RP oils were obtained. The liquid from the first condenser was brown, with extremely low viscosity and flowed freely at room temperature. The liquid from the second condenser was light yellow and also had very low viscosity and appeared to be 95% water and 5% dissolved organics. The liquid from the ESP was similar to that from the first condenser in appearance and viscosity. The liquids from the first condenser and the ESP were immiscible with water and formed two phases when water was added. However, for conventional pyrolysis, the liquid product was miscible with water. The fractional pyrolysis oils appeared to be less viscous that the corresponding conventional rapid pyrolysis oil.

GC/MS analysis of the liquid from the first condenser and the ESP showed similar chemical composition. The liquids composition was almost exclusively phenolics with no detectable carbohydrate pyrolysis products (see Table 2). The constituents of the liquids from these two liquid fractions were mostly phenol, cresols, guaiacol, methyl-substituted phenols, small quantities of indene, and substituted naphthalenes. Neither benzene, toluene, nor xylenes were detected in any of the products (see Table 2). These results were confirmed by $^{13}$C-NMR analysis of the liquid products. The $^{13}$C-NMR data however, showed a small fraction of carbohydrate decomposition products in the oils. The GC/MS analysis of the whole oil of noncatalytic pyrolysis of hybrid poplar as well as the phenol neutral (PN) fraction extracted from the whole oil are also shown in Table 2 to illustrate the differences between the oils. Whereas the catalytic pyrolysis oil and the PN oils have very low carbohydrate decomposition products, the whole oil is very rich in such products. The oils from the ESP and the first condenser are even richer in phenolics than the PN oil.

TABLE 2

GC/MS estimated composition of catalytic pyrolysis oils.

| | (area counts ×10$^6$) Catalytic | | | | | | Non-Catalytic | |
|---|---|---|---|---|---|---|---|---|
| Analyze | SG1461-040 1$^{st}$ Cond | SG1461-04 2$^{nd}$ Cond | SG1461-04 ESP | SG1461-04 21$^{st}$ Cond | SG1461-04 22$^{nd}$ Cond | SG1461-04 2ESP | Whole Poplar Oil | Run 160 Poplar PN |
| Hydroxyacetaldehyde | 0 | 37 | 0 | 21 | 19 | 0 | 46 | 0 |
| Hydroxyacetone | 0 | 32 | 0 | 0 | 19 | 0 | 175 | 0 |
| Ethanedial | 0 | 20 | 0 | 0 | 10 | 0 | 0 | 0 |
| 2-cyclopenten-1-one | 194 | 50 | 194 | 163 | 33 | 193 | 24 | 35 |
| 3-methyl-2cyclopenten-1-one | 41 | 0 | 36 | 30 | 0 | 32 | 0 | 0 |
| Phenol | 373 | 49 | 350 | 333 | 30 | 356 | 119 | 222 |

TABLE 2-continued

GC/MS estimated composition of catalytic pyrolysis oils.

| | (area counts ×10$^6$) Catalytic | | | | | | Non-Catalytic | |
|---|---|---|---|---|---|---|---|---|
| Analyze | SG1461-040 1$^{st}$ Cond | SG1461-04 2$^{nd}$ Cond | SG1461-04 ESP | SG1461-04 21$^{st}$ Cond | SG1461-04 22$^{nd}$ Cond | SG1461-04 2ESP | Whole Poplar Oil | Run 160 Poplar PN |
| Indan | 12 | 0 | 15 | 10 | 0 | 13 | 0 | 13 |
| Indene | 36 | 0 | 43 | 32 | 0 | 46 | 0 | 11 |
| 2-methyl phenol (o-cresol) | 239 | 18 | 234 | 201 | 11 | 234 | 30 | 68 |
| 4-methyl phenol (p-cresol) | 419 | 18 | 387 | 316 | 11 | 362 | 19 | 55 |
| 2-methoxy phenol (guaiacol) | 60 | 0 | 61 | 48 | 0 | 60 | 29 | 41 |
| methylbenzofuran | 37 | 0 | 44 | 36 | 0 | 47 | 0 | 13 |
| 2,4-dimethyl phenol | 131 | 0 | 128 | 97 | 0 | 119 | 13 | 24 |
| dimethyl phenol | 201 | 0 | 184 | 138 | 0 | 176 | 0 | 17 |
| 3,5-dimethyl phenol | 0 | 0 | 0 | 0 | 0 | 0 | 0 | 0 |
| 1,2-dihydroxy benzene (calechol) | 213 | 0 | 130 | 104 | 0 | 123 | 33 | 191 |
| 2-methoxy-4-methyl phenyl(4-methyl guaiacol) | 0 | 0 | 0 | 0 | 0 | 0 | 0 | 0 |
| Naphthalene | 69 | 0 | 76 | 68 | 0 | 79 | 12 | 0 |
| 2,4,6-trimethy phenol | 47 | 0 | 45 | 38 | 0 | 44 | 0 | 20 |
| 1,2-dihydroxy-3-methyl benzene (3-methyl catachol) | 55 | 0 | 67 | 58 | 0 | 78 | 24 | 76 |
| dimethlylindene/trimethyl phenol | 192 | 0 | 185 | 138 | 0 | 182 | 0 | 36 |
| 2-methoxy-4-ethyl phenyl(4-ethyl guaiacol) | 46 | 0 | 47 | 35 | 0 | 54 | 23 | 39 |
| 2-methyl naphthalene | 169 | 0 | 184 | 124 | 0 | 159 | 0 | 0 |
| 1-methyl naphthalene | 0 | 0 | 0 | 0 | 0 | 0 | 0 | 0 |
| 2,6-dimenthoxy phenol | 113 | 0 | 148 | 98 | 0 | 122 | 68 | 92 |
| Methyl benzofuran/cinnamyaldehyde | 208 | 0 | 187 | 119 | 0 | 205 | 0 | 44 |
| 2-ethyl naphthalene | 0 | 0 | 0 | 0 | 0 | 81 | 14 | 25 |
| dimethyl naphthalene | 229 | 0 | 221 | 143 | 0 | 204 | 0 | 0 |
| 2-6-dimethoxy-4-methyl phenol | 164 | 0 | 152 | 93 | 0 | 157 | 43 | 41 |
| 1-(4-hydroxy-3-methoxy phenyl) propene | 182 | 0 | 181 | 114 | 0 | 175 | 53 | 68 |
| Levoghican | 0 | 0 | 0 | 0 | 0 | 0 | 213 | 0 |
| syringaldehyde | 152 | 0 | 171 | 85 | 0 | 152 | 0 | 36 |
| 1-(3,5-dimethoxy-4dydroxy phenyl) propene/3-methoxy-4-hydroxy cinnamic acid | 174 | 0 | 278 | 116 | 0 | 264 | 61 | 61 |

The same mass of oil was used for all samples analyze. The first three samples are from run 1461-40 #4, the next three are from run 1461-42 #5. All data are raw area counls (×10$^6$) but because the same mass of sample was used the results could be compared on relative basis.

The $^{13}$C-NMR spectra of the two catalytic pyrolysis liquids and the RP oil are shown in FIGS. 1, 2, and 3. The signals between 0 ppm to 35 ppm were due to side chains; signals from 60 ppm to 100 ppm derived from carbohydrate degradation products whereas those from 100 ppm to 160 ppm derived from lignin or phenolic compounds. The signals at 210 ppm were due to carboxylic carbons. It is clear from FIGS. 1, 2, and 3 that the catalytic pyrolysis liquids lost most of their carbohydrate degradation components whereas the RP oil retained all those components.

It is interesting to note the difference in the height of the methoxyl peak at 58 ppm in the NMR spectra of the catalytic and non-catalytic products. The catalytic pyrolysis oils appeared to be less methoxylated than the non-catalytic pyrolysis oils. This suggests that either demethylation or demethoxylation reactions took place during the process.

The liquid from the first condenser, which appeared to be mostly water contained carbohydrate decomposition products such as hydroxyacetaldehyde, hydroxyacetone, ethanedial and 2-cyclopentene-1-one in addition to phenol and cresols. The product slate from this fraction was extremely narrow and this was confirmed by the 13C-NMR results (see FIG. 2).

The char/coke yields from these runs were low compared to those reported for post pyrolysis catalysis [19-26, 37]. These yields were comparable to those obtained for only the char fraction of RP solid products. No attempt was made to distinguish between coke and char and no farther analysis of this solid product was carried out.

The gas yields were high compared to the RP process. The gaseous product was a mixture of $C_1$-$C_4$ hydrocarbons, carbon monoxide (CO), and carbon dioxide ($CO_2$). About 90% by weight of the gaseous products was CO and $CO_2$ and the rest was a mixture of hydrocarbons. The hydrocarbons detected by gas chromatography were methane, ethane, propane, butane, ethylene, and butene. Three other small peaks were present in the chromatogram but these were not identified. Butene was the most abundant hydrocarbon and in some cases constituted 30% of the total hydrocarbon products.

The elemental composition of the liquid products shown in Table 3 had high carbon (71%) and relatively low oxygen content (21%) compared to non-catalytic pyrolysis oils. The HHV was consequently high (30.5 MJ/kg) compared to 23 MJ/kg for the non-catalytic pyrolysis oil. Typical non-catalytic pyrolysis oils from hybrid poplar have 54-57% carbon and 36-38% oxygen and HHVs 23-24 MJ/kg [1].

TABLE 3

Elemental composition and HHV of fractional pyrolysis liquid products of hybrid poplar wood.

| Element | Composition |
|---|---|
| Carbon (%) | 71.32 |
| Hydrogen (%) | 6.82 |
| Oxygen (%) | 21.41 |
| Nitrogen (%) | 0.24 |
| Sulfur (%) | 0.01 |

TABLE 3-continued

Elemental composition and HHV of fractional pyrolysis
liquid products of hybrid poplar wood.

| Element | Composition |
| --- | --- |
| Ash (%) | 0.09 |
| HHV (MJ/kg) | 30.5 |

Example 5

Molecular Weight Distribution of Liquid Products

Gel permeation chromatography (GPC) of the liquid products showed very low molecular mass distribution of the products. The number average molecular weight (Mn) of the oil from the ESP and the chilled water condenser were both 160 while the weight average molecular weight (Mw) distribution were 215 and 220 for the ESP and chilled water condenser oils respectively. The molecular mass distribution of these products was about one half those reported for phenol/neutral fraction of conventional rapid pyrolysis products (Mn=290, Mw=440) (FIG. 4).

Example 6

Catalyst Activity

The CO and $CO_2$ concentrations appeared to vary with time during the catalytic pyrolysis. The variation was probably due to catalyst deactivation. In these studies catalyst activity was monitored by following the variation in CO and $CO_2$ composition in the gaseous product mixture. From the GC analysis of the gases, we compared $CO/CO_2$ ratio of the catalytic pyrolysis process with a non-catalytic pyrolysis process. The non-catalytic process was carried out in a silica sand media. The $CO/CO_2$ ratio for the catalytic pyrolysis process decreased with time and appeared to approach the non-catalytic pyrolysis $CO/CO_2$ ratio (FIG. 5). However, the run was not carried on far enough to prove whether the activity was asymptotic to the silica sand pyrolysis or it dropped to that value.

The $CO/CO_2$ ratio varied from 2.2 to 2.8 during the runs. At the early stages of the run, the ratio was high but gradually decreased with time. In contrast, $CO/CO_2$ ratio for noncatalyzed reactions was typically 1.3-1.4 (see FIG. 5) and remained almost constant throughout each run. If we assume that this ratio is a true monitor of catalytic activity, then it appears the catalyst was still active after three hours run albeit less active than the fresh catalyst. This finding is significant because it provides a simple method for monitoring catalyst activity.

Discussion of Experimental Results

The fractional catalytic pyrolysis results above were compared with the non-catalytic process, however, could such comparisons be justified? The two processes could be compared because the degree of conversion was similar for both cases. The conversion was defined as:

$$\frac{[\text{Mass of Orginial feed (raw biomass)} - \text{Mass of unconverted feed}]}{[\text{Mass of Orginial feed (raw biomass)}]} * 100.$$

The unconverted feed in this case was the char/ash. The char/ash for the catalytic pyrolysis was about 11.5%, which was similar to what was obtained for non-catalytic processes.

Under post-pyrolysis catalysis conditions, biomass feedstocks tend to produce very high coke yields, which rapidly deactivate the catalyst [19,20,37]. The post pyrolysis catalysis liquid products usually contain benzene, toluene, xylene, naphthalenes, substituted benzene and naphthalenic products [19,20,22]. On the contrary, in the fractional catalytic pyrolysis process where the catalyst and the biomass feed were mixed the catalyst was still active after 3 hours of pyrolysis and the product slate were quite different from those reported for post pyrolysis catalysis (see FIGS. 1&3). The total char/coke yield was equivalent to the coke yield alone from the post pyrolysis catalysis runs [19,20,22]. The gaseous components were however similar for both processes.

Clearly in the fractional catalytic process, there appeared to be a selective pyrolysis and gasification of the biomass components. The carbohydrate degradation products appeared to be more labile than the lignin degradation components. Thus, the carbohydrate pyrolysis products were rapidly converted into gaseous products while the lignin pyrolysis products were more refractory. The gaseous products were mostly carbon dioxide, carbon monoxide and $C_1$-$C_4$ hydrocarbons. As the catalyst slowly deactivated, it appeared some carbohydrate pyrolysis products such as hydroxyacetaldehyde, ethanedial, hydroxyacetone, and cyclopeteneone were not cracked and these condensed with the aqueous phase in the chilled water condenser.

On the contrary, the lignin pyrolysis products underwent limited gasification reactions and formed the bulk of the liquid products. Demethylation, demethoxylation and alkylation of the aromatic ring appeared to be the predominant reactions. The presence of high proportions of cresols and dihydroxy phenols (catechol) suggested that demethylation, demethoxylation and cleavage of the lignin decomposition products occurred. The presence of methyl and ethyl phenols in the liquid product also suggested that there might have been some alkylation reactions.

The yield of the liquid products also supported the above explanation. The total liquid yield was only 30% and the water content was 30-40%. This implies that the organic liquid yield was only 18-21%. The total lignin content of hybrid poplar wood is about 22-24% [38], and thus taking into consideration the demethoxylation reactions and loss of some side chains, the above organic liquid yield appear to be reasonable. Thus, the fractional catalytic pyrolysis appeared to favor production of modified liquid phenolics from the lignin fraction of the biomass while converting the carbohydrate fraction to gases.

Catalyst Deactivation

The absence of liquid condensate in any significant quantities during the first hour of pyrolysis suggested that during this phase of the pyrolysis, the catalyst was extremely active and the major reaction was gasification. Coke formation appeared to be minimal at worst because the sum of coke and char from the pyrolysis process was only 12%. This could be attributed to the minimal secondary conversion of the primary lignin pyrolysis products to hydrocarbons. These suggest that the lignin pyrolysis products were mostly responsible for the coke formation reactions and thus contribute strongly to the deactivation of the catalyst especially as obtains in post pyrolysis catalysis.

The rejection of oxygen in the feed as CO and water provides a simple method for following the deactivation of the catalyst. As shown in FIG. 5, during non-catalytic pyrolysis, the ratio of $CO/CO_2$ was almost constant and close to one, but during catalytic pyrolysis, this ratio varied with time and approached the non-catalytic value. TI11S trend implied that the catalyst was gradually deactivating and when the catalyst is completely deactivated, the ratio of $CO/CO_2$ will be similar to that of the non-catalytic process.

CONCLUSIONS

The above demonstrates the concept of fractional pyrolysis of biomass. The most important factor is the choice of catalyst. By selecting a suitable catalyst, various components of the biomass feedstocks can be converted in situ into desirable products. This work showed that the lignin fraction of the biomass could be effectively converted into phenolics with low char yield when catalysis and pyrolysis reactions were performed simultaneously. Char yields for this process were similar to those obtained from conventional rapid pyrolysis. The molecular mass distribution of fractional catalytic pyrolysis process were about one half that obtained for phenol/neutral fraction in a conventional pyrolysis and there appeared to be considerable demethylation and demethoxylation reactions.

REFERENCES

1. Agblevor, F.A; Besler S.; Wiselogel A.E. Fast pyrolysis of stored biomass feedstocks. *Energy & Fuels* 1995, 9(4), 635-640.
2. Scott, D.S.; J. Piskorz, J. *Can. J. Chern. Eng.* 1982, 60, 666
3. Graham, R.G.; Bergougnou, M.A. Fast pyrolysis of biomass. *J. Anal. Appl. Pyrolysis* 1984; 6, 95-135.
4. Diebold, PJ.; Scahill, 1 Production of Primary Pyrolysis Oils in a Vortex Reactor. In *Pyrolysis Oils from Biomass*, Soltes, E.J.; Milne T.A., Eds.; ACS Symposium Series 376; American Chemical Society: Washington D.C. 1988; pp 31-40.
5. Piskorz, J.; Scott, D.S.; Radlein, D. Composition of oils obtained by fast pyrolysis of different woods. In *Pyrolysis oils from biomass: producing, analyzing, and upgrading*, Soltes, E.J. and Milne T.A, Eds.; ACS Symposium Series 376; American Chemical Society: Washington D.C. 1988; pp 167-178.
6. Elder, T. Effect of process conditions on the yield of pyrolytic products from southern pine. *Wood and Fiber Science* 1984, 16(2), 169-179.
7. Evans, R.J.; Milne T. A Molecular characterization of the pyrolysis of biomass. 1. Fundamentals. *Energy & Fuels* 1987, 1(2), 123-137.
8. Font, R.; Marcillia, A; Verdu, E.; Devesa, J. Fluidized-bed flash pyrolysis of almond shells. Temperature influence and catalyst screening. *Ind. Eng. Chem. Prod. Res. Dev.* 1986, 25, 491-496.
9. Maschio, G.; Koufopanos, C.; Lucchesi, A. Pyrolysis, a promising route for biomass utilization. *Bioresource Technology* 1992, 42, 219-231.
10. Besler, S.; Agblevor, F.; Davis, M.; Eddy, F.; Johnson, D.; Wiselogel, A. Fluidized bed Pyrolysis of Terrestrial Biomass Feedstocks. In *Proc. Bioenergy '94, Sixth National Bioenergy Conference*; Western Regional Biomass Energy Program: Golden, Colo. 1994; Vol. 1, pp. 43-50.
II. Czernik, S.; Scahill, I; Diebold, J. The production of liquid fuel by fast pyrolysis of biomass. *J Solar Energy Eng.* 1995, 117, 2-6.
12. Scott, D.S.; Piskorz, J.; Radlein, D. Liquid products from continuous flash pyrolysis of biomass. *Ind. Eng. Chem. Process Design and Dev.* 1985, 24, 581-8.
13. Bohn, M.S.; Benham, C.B. Biomass pyrolysis with entrained flow reactor. *Ind. Eng. Chem. Process Design Dev.* 1984, 23, 355-63.
14. Scott, D.S.; Piskorz, J. The continuous flash pyrolysis of biomass. *Can. J. Chem. Eng.* 1984, 62, 404-12.
15. Diehold, J.P.; Czernik, S. Additives to lower and stabilize viscosity of pyrolysis oils during storage. *Energy & Fuels* 1997, 11(5), 1081-1091.
16. Aubin, H.; Roy, C. Study on the corrosiveness of wood pyrolysis oils. *Fuel Science International* 1990, 8(1), 77-86.
17. Agblevor, F.A; Scahill, J.; Johnson, K.D. Pyrolysis char catalyzed destabilization of biocrude oils. In *Innovative Advances in the Forest Product Industries*; Brogdon, B.N.; Hart, P.W.; Ransdell, J.C.; Scheller, B.L., Eds.; AIChE Symposium Series 319; American Institute of Chemical Engineers: New York, N.Y. 1998; Vol 94, pp. 146-150.
18. Agblevor, F.A; Besler-Guran, S. Inorganic compounds in biomass feedstocks. I. Effect on the quality of fast pyrolysis oils. *Energy & Fuels* 1996, 10(2), 293-298.
19. Agblevor, F.A.; Rejai, B.; Evans, R.J.; Johnson, K.D. Pyrolytic Analysis and Catalytic Upgrading of Lignocellulosic Materials by Molecular Beam Mass Spectrometry. In *Energy from Biomass and Wastes XVII*. Institute of Gas Technology (IOT), Chicago, Ill. 1993; pp. 767-795.
20. Sharma, R.K.; Bakhshi, N.N. Upgrading of wood-derived bio-oil over HZSM-5. *Biuresuurce Technul.* 1991, 35(1), 57-66.
21. Srinvas, S.T.; Dalai, A.K.; Bakhshi, N.N. Thermal and catalytic upgrading of biomass derived oil in a dual reaction system. *Can. J. Chem. Eng.* 2000, 78(2), 343-54.
22. Sharma, R.K.; Bakhshi, N.N. Catalytic upgrading of biomass-derived oils to transportation fuels and chemicals. *Can. J. Chem. Eng.* 1991, 69, 1071-81.
23. Bahtia, V.K.; Mittal, K.G.; Mehrotra, R.P.; Garg, V.K.; Mehrotra, M.; Sarin, R.K. Catalytic conversion of Euphorbia nerifolia biocrude into petroleum hydrocarbons. Short Communications. *Fuel* 1988, 67, 1708-1709.
24. Weisz, P.B.; Haag, W.O.; Rhodewald, P.G. Catalytic production of high-grade fuel (gasoline) from biomass compounds by shape-selective catalysis. *Science* 179, 206, 5758.
25. Bahtia, V.K.; Padmaja, K.V.; Kamra, S; Singh, J.; Badoni, R.P. Upgrading of biomass constituents to liquid fuels. *Fuel* 1993, 72, 101-104.
26. Diebold, J.; Scahill, J. Biomass to Gasoline: Upgrading pyrolysis vapors to aromatic gasoline with zeolite catalysis at atmospheric pressure. In *Pyrolysis Oilsfrom Biomass*; Soltes, E.J.; Milne, T.A., Eds.; ACS Symposium Series 376; American Chemical Society: Washington: D.C., 1988; p. 264.
27. Chum, H.; Diebold, J.; Scahill, J.; Johnson, D.; Black, S.; Schroeder, H.; Kreibich, R.E. Biomass pyrolysis oil feedstocks for phenolic adhesives. In *Adhesives from Renewable Resources*; Hemingway, R.W.; Conner, A.H.; Brabham, S.J., Eds.; ACS Symposium Series 385, American Chemical Society: Washington D.C. 1989; pp. B5-151.
28. Elder, J.T. The characterization and potential utilization of phenolic compounds found in pyrolysis oil. Ph.D. Dissertation, Texas A&M University, 1979.

29. Russel, J.; Reinmath, W.F. Method for making adhesives from biomass. U.S. Pat. No. 4,508,886, 1985.
30. Rolin, A.; Richard, C.; Masson, D.; Deglise, X. Catalytic conversion of biomass by fast pyrolysis. *J. Anal. Appl. Pyrolysis* 1983, 5, 151-166.
31. Edyc, L.A; Richards, G.N.; Zheng, G. Transition metals as catalysts for pyrolysis and gasification of biomass. *Preprints, Fuel Chemistry Division;* 202nd ACS National Meetiug, New York, N.Y. 1991; p. 1715-1722.
32. Aznar, M.P.; Corella, J.; Delgado, I; Lahoz, J. Improved steam gasification of lignocellulosic residues in a fluidized bed with commercial steam reforming catalyst. *Ind. Eng. Chem. Res.* 1993, 32, 1-10.
33. Paisley, M.A. Anson, D. Biomass gasification for gas-turbine-based power generation. *J. Engineering/or Gas Turbines and Power,* 1998, 120(2), 284-8.
34. Di Blasi, C.; Signorelli, G.; Portoricco, G. Countercurrent fixed-bed gasification of biomass at laboratory scale. *Ind. Eng. Chem. Res.* 1999, 38(7), 2571-81.
35. Corella, J.; Orio, A.; Aznar, P. Biomass gasification with air in fluidized bed: reforming of the gas composition with commercial steam reforming catalysts. *Ind. Eng. Chem. Res.* 1998, 37(7), 4617-24.
36. Agblevor, F.A.; BesJer-Guran, S.; WiseJogeJ, A.E. Production of oxygenated fuels from biomass: impact of feedstock storage. *Fuel Science & Technol. International,* 1996, 14(4), 589-612.
37. Home, P.A.; Williams, P.T. The effect of zeolite ZSM-5 catalyst deactivation using the upgrading of biomass derived pyrolysis vapors. *J. Anal Appl. Pyrol.* 1995, 34, 65-85.
38. Milne, T.A.; Chum, H.L.; Agblevor, F.; Johnson, D.K. Standardized Analytical Methods. *Biomass & Bioenergy* 1992, 2 (1-6), 341-366.

What is claimed is:

1. A fractional catalytic pyrolysis process for converting biomass into a product slate without the need for post-pyrolysis separation comprising:
   providing a catalyst bed in a fluid state, the catalyst being maintained at a temperature suitable for pyrolysis;
   providing a flow of a non-reactive fluid into the catalyst bed;
   entraining a biomass in the flow of non-reactive fluid, so that the biomass is delivered to the catalyst bed and pyrolyzed; and
   collecting the gases and vapors that result from the pyrolyzed biomass, wherein the gases and vapors are the resultant product slate, wherein the resultant product slate contains phenolics with insubstantial amounts of carbohydrates.

2. The fractional catalytic pyrolysis process of claim 1, wherein the catalyst is a zeolite catalyst.

3. The factional catalytic pyrolysis process of claim 2, wherein the zeolite catalyst is H-ZMS-5.

4. The fractional catalytic pyrolysis process of claim 1, wherein the catalyst is a super acid catalyst.

5. The fractional catalytic pyrolysis process of claim 4, wherein the super acid catalyst is a sulfated zirconium super acid catalyst.

6. The fractional catalytic pyrolysis process of claim 1, wherein the catalyst is heated to a temperature of about 400° C. to about 650° C.

7. The fractional catalytic pyrolysis process of claim 6, wherein the catalyst is heated to a temperature of about 450° C. to about 600° C.

8. The fractional catalytic pyrolysis process of claim 7, wherein the catalyst is heated to a temperature of about 500° C.

9. The fractional catalytic pyrolysis process of claim 1, wherein the non-reactive fluid is nitrogen.

10. The fractional catalytic pyrolysis of claim 1, wherein the non-reactive fluid is pyrolysis gas.

11. The fractional catalytic pyrolysis process of claim 1, wherein the biomass is selected from the group consisting of: whole plant materials, biomass residues, organosolv lignins, and mixtures thereof.

12. The fractional catalytic process of claim 1, wherein the gasses that result from the pyrolyzed biomass are collected using one or more condensers.

13. The fractional catalytic process of claim 12, wherein the condensers are selected from the group consisting of: chilled water condensers, electrostatic precipitators, coalescence filters, and combinations thereof.

14. The fractional catalytic pyrolysis process of claim 1, wherein the resultant product slate contains one ore more of the following: phenols, cresols, catechols, guaiacol, methyl-substituted phenols, indene, and substituted naphthalene.

15. The fractional catalytic pyrolysis process of claim 1, wherein the resultant product slate further contains synthesis gas.

16. The fractional catalytic pyrolysis process of claim 1, wherein the resultant product slate further contains char and coke solids.

17. The fractional catalytic pyrolysis process of claim 1, wherein the resultant product slate further contains $C_1$-$C_4$ hydrocarbons.

18. The fractional catalytic pyrolysis process of claim 1, wherein the lignin in the biomass are converted primarily to phenols and cresols.

19. The fractional catalytic pyrolysis process of claim 1, wherein the carbohydrates in the biomass are converted primarily to one or more of the following:
   $C_1$-$C_4$ hydrocarbons, hydrogen, carbon monoxide, and carbon dioxide.

20. A fractional catalytic pyrolysis process for converting biomass into a product slate without the need for post-pyrolysis separation comprising:
   providing a catalyst bed in a fluid state, the catalyst being maintained at a temperature suitable for pyrolysis;
   providing a flow of a non-reactive fluid into the catalyst bed;
   entraining a biomass in the flow of non-reactive fluid, so that the biomass is delivered to the catalyst bed and pyrolyzed; and
   collecting the gases and vapors that result from the pyrolyzed biomass using one or more condensers, wherein the gases and vapors are the resultant product slate, wherein the resultant product slate contains phenolics with insubstantial amounts of carbohydrates.

21. The fractional catalytic pyrolysis process of claim 20, wherein the catalyst is a zeolite catalyst.

22. The factional catalytic pyrolysis process of claim 21, wherein the zeolite catalyst is H-ZMS-5.

23. The fractional catalytic pyrolysis process of claim 20, wherein the catalyst is a super acid catalyst.

24. The fractional catalytic pyrolysis process of claim 23, wherein the super acid catalyst is a sulfated zirconium super acid catalyst.

* * * * *